H. F. BROADHURST.
FILLING AND WEIGHING APPARATUS.
APPLICATION FILED DEC. 1, 1910.

1,007,915.

Patented Nov. 7, 1911.
3 SHEETS—SHEET 1.

Witnesses

Inventor
Herbert F. Broadhurst,
By E. E. Vrooman,
Atty.

H. F. BROADHURST.
FILLING AND WEIGHING APPARATUS.
APPLICATION FILED DEC. 1, 1910.

1,007,915.

Patented Nov. 7, 1911.
3 SHEETS—SHEET 3.

Fig. 3.

Witnesses

Inventor
Herbert F. Broadhurst
By C. C. Vrooman
Atty.

UNITED STATES PATENT OFFICE.

HERBERT FREDERICK BROADHURST, OF LONDON, ENGLAND.

FILLING AND WEIGHING APPARATUS.

1,007,915.  Specification of Letters Patent.  Patented Nov. 7, 1911.

Application filed December 1, 1910. Serial No. 595,157.

*To all whom it may concern:*

Be it known that I, HERBERT FREDERICK BROADHURST, of 165 Pentonville road, London, N., England, engineer, have invented new and useful Filling and Weighing Apparatus; and I do hereby declare that the following is a full, clear, and exact description of the same, reference being had to the accompanying drawings, forming a part hereof.

This invention has reference to apparatus for automatically filling and weighing liquids or semi-liquids into cans or other vessels and has for its object to provide a simple and reliable device whereby the co-acting weighing mechanism and supplying device is maintained inoperative until the mouth or opening of the vessel to be filled is properly arranged in position beneath the filling nozzle of the tank pipe or vessel from which the material is delivered and to provide improved means whereby the supply of material is promptly and automatically cut off as soon as the predetermined weight of the material is attained.

With these ends in view my invention consists in the improved construction and combination of parts all as more hereinafter particularly described and finally pointed out in the claims.

In order that my invention may be readily understood and carried into effect I will now proceed to describe the same fully with reference to the accompanying drawings in which:—

Figure 1:
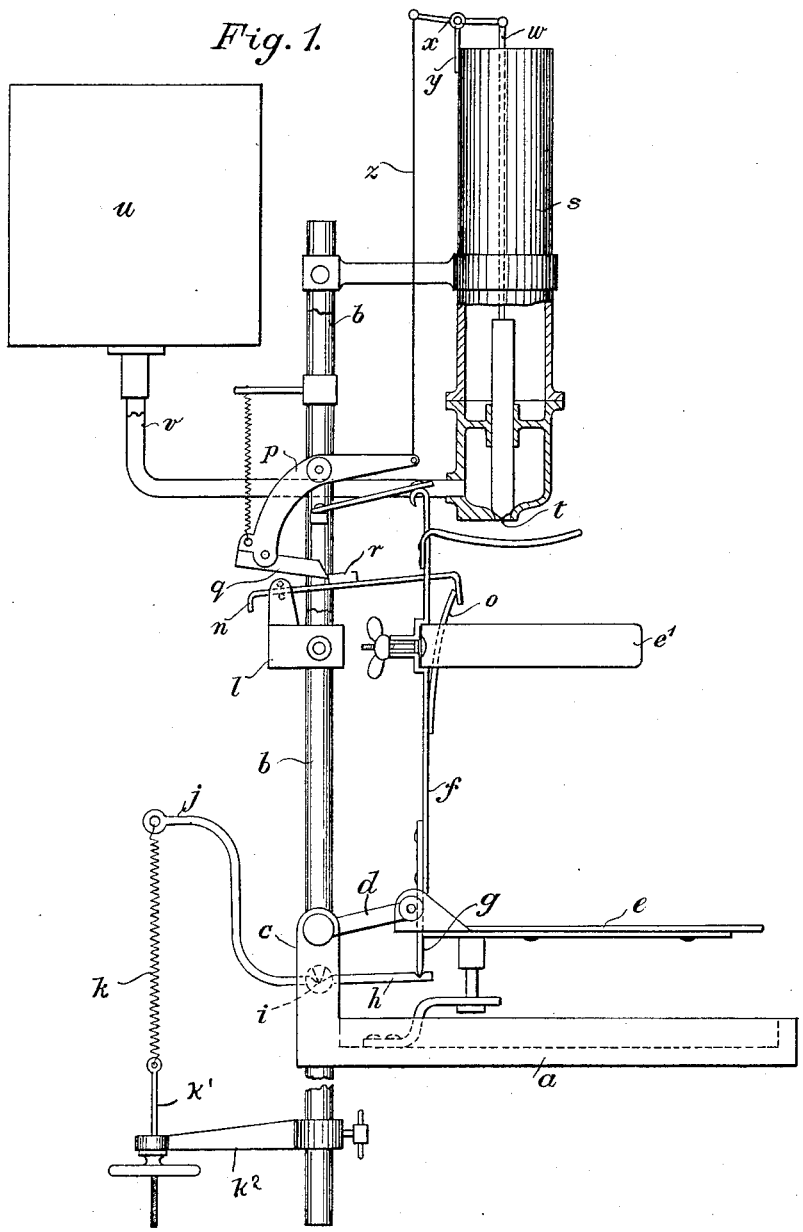
Figure 2:
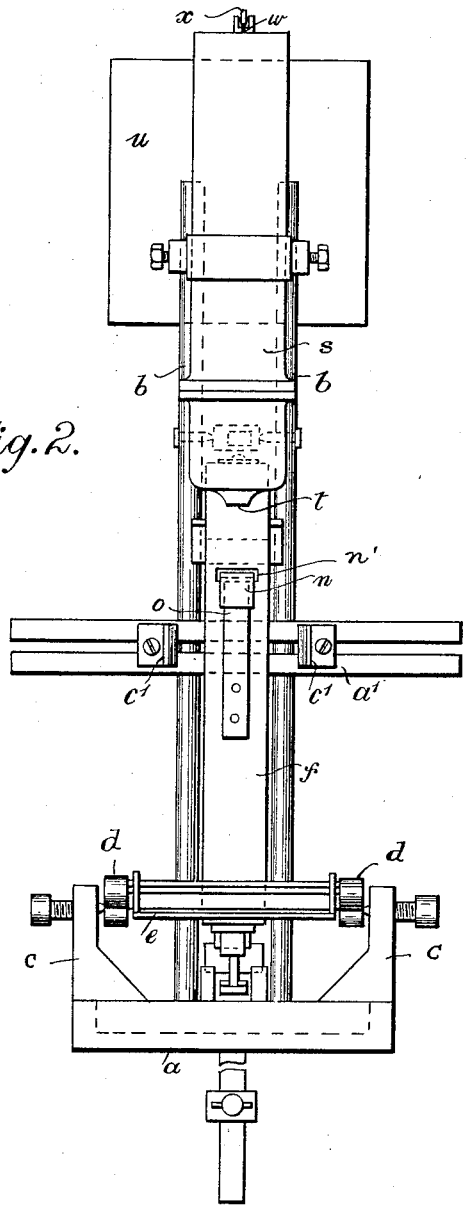

Figure 1 is a side elevation of a device embodying my invention, and Fig. 2 is a front elevation of the same. Fig. 3 is a detail view of a modified part of the apparatus hereinafter more particularly described.

Referring now to Fig. 1 upon an appropriate base $a$ are secured two vertical standards $b$ serving to support the various parts of the mechanism. Pivotally mounted in brackets $c$ formed on or secured to the base $a$ is a pair of arms $d$ between which the weighing platform $e$ is pivoted. Said platform carries a vertical back $f$ rigidly secured thereto and the weighing platform $e$ is provided with a knife edge $g$ adapted to be supported by a scale beam $h$ mounted on the base $a$ by means of the knife edges $i$. The said scale beam $h$ is of peculiar construction and forms an important feature of my invention as it effectually prevents sluggish downward movement of the platform $e$ and permits this latter to descend smartly directly the predetermined weight of material is delivered into the receptacle; a result which is highly desirable in apparatus of this type as one of the chief difficulties heretofore encountered has been to so construct the weighing mechanism that the platform shall not gradually sink under the accumulating weight of the material but shall be maintained in its uppermost position until the predetermined weight of material is delivered and then only descend smartly and rapidly so cutting off the supply promptly. This latter result is obtained by a scale beam under my present invention, as a variable center of effort is produced thus allowing the platform to descend promptly instead of sluggishly. With this important object in view I crank the scale beam $h$ in the manner shown in Fig. 1 and to the end $j$ secure a spiral spring $k$ the other end of which is attached to the standards $b$ in any suitable manner, such for example as by means of a rod $k^1$, that is adjustably connected to the free end of a laterally projecting arm $k^2$ that is adjustable on one of the standards $b$.

To the aforesaid standards $b$ bracket $l$ is secured carrying two pins serving to support one end of a lever $n$ the other end of which passes through a slot $n^1$ formed in the aforesaid back $f$ being then bent down as shown so as to engage a leaf spring $e$ secured to the back $f$. Pivoted between the standards $b$ is a bell crank lever $p$ the lower end of which carries a pivoted tripping arm or pawl $q$ adapted to engage with a stop $r$ rigidly secured to the lever $n$.

$s$ indicates a supply vessel provided with a delivery nozzle or orifice $t$ and adapted to be supplied with the material from a tank $u$ by means of a conduit $v$. The nozzle $t$ is normally closed by a valve of suitable construction such as a cone valve for example the valve stem $w$ of which projects to or above the top of the vessel $s$ where it is pivotally secured to one end of an arm $x$ pivoted to the bracket $y$ the other end of said arm $x$ being connected by means of a rod wire or the like $z$ with the bell crank lever $p$.

Rigidly secured to the vertical back $f$ is a slotted guide $a^1$ (Fig. 2) adapted to receive the adjustable arms or guides $c^1$ serving to grip the upper part of the can or other vessel which it is desired to fill and preventing the weight of the valve acting through rod $z$ and bell crank $p$ pushing the can away from its proper position against back $f$ and under valve $t$.

The operation of a device constructed in accordance with my invention is as follows:—The parts being in the position shown in Fig. 1 the can or other receptacle which it is desired to fill is placed upon the platform $e$ and between the guides $c^1$ said receptacle being pushed against the vertical back $f$. The lever $n$ will thus be caused to slide in the direction of the arrow bringing its stop $r$ against the nose of the pawl $q$ thus turning the bell crank lever $p$ about its pivot depressing the rod $z$ and raising the valve stem $w$ through the arm $x$ thus opening the valve arranged in the nozzle $t$ and allowing the material to flow from the vessel $s$ into the receptacle upon the weighing platform $e$. When the predetermined weight of material has flowed into the receptacle, the resistance of the spring $k$ arranged upon the end $j$ of the scale beam $h$ will be overcome and platform $e$ will smartly descend and the stop $r$ will be withdrawn from the nose of the pawl $q$ and the bell crank $p$ will turn about its pivot allowing rod $z$ to rise and the valve stem $w$ to descend by its own weight and close the delivery nozzle $t$ instantly cutting off the flow of material.

The modified construction shown in Fig. 3 is more particularly designed for use when it is desired to fill a viscid liquid into a receptacle and in this construction I replace the vessel $s$ by a vessel $s^1$ having a discharge outlet $s^2$, and a supply inlet $s^x$ communicating with a closed delivery tank in which the material it is desired to deliver is stored under pressure of air or other medium. Within the vessel $s^1$ is mounted a valve $s^3$ the stem of which carries a diaphragm $s^4$ as will be clearly seen in the drawing. Mounted upon the standards $b$ is a cylinder $s^5$ having a port $s^6$ and inlet port $s^7$ and outlet port $s^{10}$. Port $s^6$ is connected by means of a pipe with the port $s^8$ in the vessel $s^1$ while port $s^7$ communicates with a vessel containing air or other fluid under pressure and the port $s^{10}$ acts as an exhaust. Within the cylinder $s^5$ the double piston $t^1$ is adapted to slide in such a manner as to place the ports $s^6$, $s^8$, $s^7$ and $s^{10}$ into communication when said piston $t^1$ is operated by the bell crank lever $p^1$. The action being that when a can is placed on the platform $e$ and against vertical back $f$ (see Fig. 1) the double piston $t^1$ rises places exhaust port $s^7$ and port $s^6$ in communication allowing all pressure to exhaust from the portion of $s^1$ which is above diaphragm $s^4$ the pressure of the material then in the space below the diaphragm $s^4$ raises the diaphragm and with it valve $s^3$ allowing the material to flow through the opening. When the weighing platform descends the pawl $q$ is tripped and double piston $t^1$ descends by means of spring $s^9$ placing port $s^6$ in communication with lower port $s^7$ and allowing pressure to reach the space above the diaphragm $s^4$ through port $s^8$ and acting on the upper surface of the diaphragm close the valve $s^3$ cutting off the supply of material.

By means of this construction a thick or viscid liquid may be readily fed through the nozzle $t$ into a can or receptacle.

Although I have described my invention as applied to an apparatus for delivering liquids or semi-liquids it will be understood that it may without departing from the spirit of my invention be utilized for filling powders into boxes or other receptacles.

In the foregoing description, I have described two practical forms of the invention but it is to be understood that the same is susceptible to further modification and structural arrangements, such as fall within the scope of the appended claims.

What I claim as my invention and desire to receive by Letters Patent is:—

1. A filling and weighing apparatus comprising a base, standards carried thereby, a source of supply carried by said standards and provided with a discharge outlet, a valve controlling said outlet, a scale carried by said base and provided with receptacle-holding means, a bell crank lever carried by one of said standards, a connection between the lever and the valve for operating said valve, and a tripping lever carried by one of said standards and operated by said scale for actuating the bell crank lever.

2. A filling and weighing apparatus comprising a base provided with vertical supporting means at one end, arms pivotally connected to said supports, a scale carried by said arms and provided with receptacle-engaging means, standards carried by said base, a delivery receptacle carried by said standards and provided with a discharge outlet, a valve controlling said outlet, means carried by said standards for controlling said valve, and a tripping lever pivotally connected to said standards and operated by the receptacle-engaging means of said scale.

3. A filling and weighing machine comprising a base, a vertically-movable scale platform pivotally connected thereto, a scale beam pivotally connected to said base and having one end pivotally connected to said platform, said beam having an upwardly-curved crank at its outer end, a spring carried by said crank, means for adjustably connecting said crank to said base, supports carried by said base, a delivery receptacle carried by said supports and provided with a discharge outlet, a valve controlling said outlet, and means operated by a vertical movement of said platform for operating said valve.

4. A filling and weighing apparatus comprising a base provided with end brackets, arms pivotally connected to said brackets, a scale platform carried by said arms, a scale beam pivotally connected to said base and having a knife edge engagement at one end with said platform, the other portion of said beam being elongated and upwardly curved and terminating in a crank, a spring carried by said crank, means for adjustably connecting said spring to said platform, supports carried by said base, a delivery receptacle carried by said supports, and means operated by a movement of said platform for controlling the discharge from said receptacle.

5. A filling and weighing apparatus comprising a base, a vertically-movable scale carried thereby, a vertical back plate carried by said scale, receptacle-engaging means carried by said plate, standards carried by said base, a delivery receptacle carried by said standards and provided with a discharge outlet, a valve controlling said outlet, a bell crank lever pivotally connected to one of said standards, an operating connection between said lever and said valve, a tripping lever carried by said standards and operated by the back plate of said platform, a lug carried by said tripping lever and normally engaging the bell crank lever, and means for rocking the bell crank lever when disengaged from said lug.

In testimony whereof I affix my signature in presence of two witnesses.

HERBERT FREDERICK BROADHURST.

Witnesses:
HERBERT D. JAMESON,
R. J. WILLIAMS.

Copies of this patent may be obtained for five cents each, by addressing the "Commissioner of Patents, Washington, D. C."